United States Patent
Raassina et al.

(10) Patent No.: US 10,167,172 B2
(45) Date of Patent: Jan. 1, 2019

(54) PASSENGER CONVEYOR WITH DEEP SLEEP MODE

(71) Applicant: Kone Corporation, Helsinki (FI)

(72) Inventors: Pasi Raassina, Helsinki (FI); Risto Jokinen, Hyvinkaa (FI); Olavi Vairio, Helsinki (FI); Ari-Pekka Lahtinen, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 15/653,916

(22) Filed: Jul. 19, 2017

(65) Prior Publication Data
US 2018/0086606 A1 Mar. 29, 2018

(30) Foreign Application Priority Data
Sep. 26, 2016 (EP) .................................. 16190661

(51) Int. Cl.
 *B66B 25/00* (2006.01)
 *B66B 27/00* (2006.01)
 (Continued)

(52) U.S. Cl.
 CPC .............. *B66B 25/00* (2013.01); *B66B 1/34* (2013.01); *B66B 27/00* (2013.01); *G01V 8/12* (2013.01)

(58) Field of Classification Search
 None
 See application file for complete search history.

(56) References Cited

U.S. PATENT DOCUMENTS

| | | | | |
|---|---|---|---|---|
| 3,902,573 A | * | 9/1975 | Grove ..................... | B66B 5/027 187/290 |
| 5,847,533 A | * | 12/1998 | Hakala ..................... | H02P 3/06 318/798 |

(Continued)

FOREIGN PATENT DOCUMENTS

| | | |
|---|---|---|
| JP | 2005/212921 A | 8/2005 |
| JP | 2009/051660 A | 3/2009 |

(Continued)

OTHER PUBLICATIONS

Extended European Search Report #16190661.5 dated Apr. 21, 2017.
Written Opinion for Extended European Search Report #16190661.5 dated Apr. 21, 2017.

*Primary Examiner* — William R Harp
(74) *Attorney, Agent, or Firm* — Harness, Dickey & Pierce, P.L.C.

(57) ABSTRACT

A passenger conveyor may include a conveyor motor controlled by a conveyor control via a motor drive, the motor drive including a frequency converter with a rectifier bridge, an intermediate DC circuit and a converter bridge connected with the conveyor motor. The rectifier bridge is configured to be connected to mains via at least one relay, which relay is controlled by the conveyor control, the conveyor comprises a deep sleep mode, in which the frequency converter as well as at least a major part of conveyor control is switched off. The intermediate DC circuit forms the power supply for the conveyor control. During the activation of the deep sleep mode, the conveyor control is configured to open the relay, whereby at least one signal circuit of the conveyor is configured to remain powered at least during the deep sleep mode.

19 Claims, 2 Drawing Sheets

(51) Int. Cl.
 *G01V 8/12* (2006.01)
 *B66B 1/34* (2006.01)

(56) References Cited

U.S. PATENT DOCUMENTS

| | | | | |
|---|---|---|---|---|
| 6,315,081 | B1* | 11/2001 | Yeo | B66B 5/02 187/290 |
| 6,454,053 | B2* | 9/2002 | Tominaga | B66B 1/30 187/290 |
| 7,866,446 | B2* | 1/2011 | Lindegger | B66B 1/2408 187/316 |
| 8,146,714 | B2* | 4/2012 | Blasko | B66B 1/30 187/290 |
| 8,230,978 | B2* | 7/2012 | Agirman | B66B 5/027 187/290 |

FOREIGN PATENT DOCUMENTS

| | | |
|---|---|---|
| JP | 2011/116527 A | 6/2011 |
| JP | 2012/006715 A | 1/2012 |

\* cited by examiner though the wake-up circuit is closing the relay, the frequency converter is powered again which leads to the intermediate DC circuit being charged up. The charge-up of the intermediate DC circuit, enables the power supply for the conveyor control and leads to a re-start of the conveyor control which automatically starts operation so that in case of the above-mentioned circumstances, the elevator is operating again in short time.

PASSENGER CONVEYOR WITH DEEP SLEEP MODE

This application claims priority to European Patent Application No. 16190661.5 filed on Sep. 26, 2016, the entire contents of which are incorporated herein by reference.

FIELD OF THE INVENTION

The present invention relates to an a passenger conveyor, particularly an elevator comprising a conveyor motor, which is controlled by a conveyor control via a motor drive, the motor drive comprising a frequency converter with a rectifier bridge, an intermediate DC circuit and a converter bridge connected to mains via at least one relay or contactor, which relay is controlled by the conveyor control. This invention could be implemented in escalators and moving sidewalks also.

BACKGROUND

A convention passenger convey may consume an excess amount of power. It is aim of the present invention to provide a passenger conveyor which has a reduced power consumption.

SUMMARY

This object is solved with a passenger conveyor and/or a corresponding method for operating a passenger conveyor. Preferred embodiments of the invention are subject-matter of the corresponding dependent claims. Preferred embodiments of the invention are also described in the descriptive section of the patent application as well as in the drawings.

According to the invention, the passenger conveyor comprises a functional deep sleep mode, in which parts of the hardware are de-energized. According to the invention, the intermediate DC circuit forms the power supply for at least a major part, preferably the complete conveyor control. This means, as long as the DC intermediate DC circuit is charged, the power supply for the conveyor control is enabled. As soon as the intermediate DC circuit is switched off, also the conveyor control is switched off because of its loss of power supply. During the activation of the deep sleep mode, the conveyor control is configured to open the relay, whereby at least one signal circuit of the conveyor is configured to remain powered at least during the deep sleep mode. This signal circuit has the task to be attentive to all situations which may require a re-start of the conveyor. These actions could for example be in case of an elevator the issuing of a car call or floor call, an activation request by a remote monitoring center, an output of an internal monitoring circuit which checks the function of elevator or building components. All these different circumstances could require an activation of the elevator so that the signal circuit is able to provide a wake-up signal for a wake-up circuit which is connected to the signal circuit and which is—as the signal circuit —being configured to be permanently powered at least during the deep sleep mode. Preferably, this signal circuit as well as the wake-up circuit are powered as long as the conveyor (elevator) itself is powered.

The wake-up circuit is configured to close the relay dependent on a signal received from the signal circuit. The signal from the signal circuit could also be a signal which is dependent from the prevailing time so that for example on Monday morning, the conveyor is automatically taken into use at a certain time. Furthermore, circumstances in the building, as for example an emergency situation e.g. fire, could lead to the immediate termination of the deep sleep mode so that the signal circuit is initiated to issue a wake-up signal for the wake-up circuit. When the wake-up circuit closes the relay, the frequency converter is powered again which leads to the intermediate DC circuit being charged up. The charge-up of the intermediate DC circuit, enables the power supply for the conveyor control and leads to a re-start of the conveyor control which automatically starts operation so that in case of the above-mentioned circumstances, the elevator is operating again in short time.

Accordingly, the invention provides a quite easy way to provide a deep sleep functionality, wherein essential hardware components, preferably the conveyor control as well as the motor drive of the conveyor are switched off. Such a conveyor has an essentially reduced power consumption which is an essential item in nowadays requirements for modern conveyors.

In a preferred embodiment of the invention, the conveyor, e.g. elevator, comprises two parallel relays, i.e. one main relay and one charging relay. Both relays are preferably connected in parallel. The main relay simple comprises a switch for at least two of the three mains phases, preferably for all three mains phases. On the other hand, the charging relay is configured to charge any capacitor or battery located in the intermediate DC circuit. The charging relay comprises at least one current limiting component connected to a corresponding charging relay switch. In this embodiment, the conveyor control is during the activation of the deep sleep mode configured to open the main relay as well as the charging relay. The waking up from the deep sleep mode is performed by the wake-up circuit in closing only the charging relay in response to a signal from the signal circuit. The closing of the charging relay leads to the recharging of the intermediate DC circuit and thus to the automatic re-start of the conveyor control which then automatically closes the main relay so that the complete frequency converter is again connected to mains.

Accordingly, in a preferred embodiment, the conveyor control is configured to automatically re-start and to close the main relay after the charging relay is closed.

In a preferred embodiment of the invention, the current limiting component is a PTC thermistor connected in series with the corresponding charging relay switch of the charging relay. Of course, other current limiting components as varistors may be used.

Preferably, the wake-up circuit comprises a power supply which could be provided separately for the wake-up circuit or together also for the signal circuit of the elevator. Preferably, the power supply is a transformer connected to mains. The power supply can be configured to be of a small size and accordingly to have a low power consumption of less than 10 W, preferably less than 5 W, more preferably less than 2 W and most preferably less than 1 W.

The signal circuit of the conveyor, e.g. elevator, may comprise any call giving devices of the elevator so that the issuing of a floor or car call immediately leads to a re-start of the elevator control and the motor drive. In case of an escalator this could be the entering of an escalator landing plate.

Preferably, the signal circuit is also connected to a remote monitoring center of the conveyor so that a remote monitoring signal may initiate immediate re-start of the conveyor control and of the motor drive.

Furthermore, the signal circuit may be connected with an internal and/or external signal issuing means, for example a monitoring means, which issues a maintenance or failure signal if a monitored component of the conveyor is malfunctioning.

Furthermore, this internal or external signal issuing means may be any monitoring means of the building as for example fire sensors, etc.

The signal issuing means may also be a clock circuit which activates the conveyor at a certain time, e.g. Monday morning.

In a preferred embodiment of the invention, the conveyor control is configured to activate the deep sleep mode after no call or other activation signal has been received by the elevator control for a predetermined time period. Such a time period may comprise several minutes, for example 5 minutes, 10 minutes, 15 minutes or preferably 30 minutes.

Furthermore, the conveyor control may be configured to activate the deep sleep mode dependent on the prevailing time. It may for example be that an office building closes at 6 o'clock. Then the last ride may have happened at shortly before 6 o'clock and the activation of the deep sleep mode may take place already 5 minutes past 6.

Of course, when the deep sleep mode is activated, it is ensured that the conveyor is not running. As mentioned above, the deep sleep mode is only activated after the conveyor remains passive, i.e. not in action for a predetermined time, e.g. 15 or 30 minutes.

In this connection it may be mentioned that the conveyor may in the case of an elevator also comprise an elevator group or an elevator multi-group with different zones.

The invention further refers to a method for operating a conveyor having a conveyor control comprising a deep sleep mode wherein the power supply of the conveyor control and of a motor drive of a conveyor motor are switched off, whereby the motor drive comprises a frequency converter with a rectifier bridge, an intermediate DC circuit and a converter bridge connected with the conveyor motor. The rectifier bridge is connected to mains via a relay, which relay is controlled by the conveyor control. The intermediate DC circuit forms the power supply for at least the major part of the conveyor control, preferably of the complete conveyor control. Only monitoring circuits located in the conveyor control which are used to supervise the conveyor control also during deep sleep may not be supplied by the intermediate DC circuit. Such a monitoring circuit can be connected with the signal circuit. During the activation of the deep sleep mode, the relay is opened and at least one signal circuit of the conveyor is remained powered. Upon receipt of a wake-up signal received from the signal circuit, the intermediate DC circuit is charged up again by closing the relay causing the conveyor control to re-start its operation. Regarding the advantages and features of this method it is referred to the above described conveyor.

In a preferred embodiment of the invention, upon receipt of a wake-up signal received from the signal circuit, the intermediate DC circuit is charged up again by closing a charging relay which comprises a current limiting component, and after charging up the intermediate DC circuit, the conveyor control is automatically initiated to close a main relay connecting the rectifier bridge with mains. This solution is easy to realize and requires less and less voluminous hardware components.

In a preferred embodiment of an inventive elevator, the wake-up call is generated in case a call is issued by any call giving device of the elevator, a remote monitoring signal is received, a monitoring circuit of the elevator issues any operation anomaly signal, or an internal or external signal issuing device issues a signal, for example a fire signal of a building monitoring device. This enables the proper and timely re-start of the elevator whenever it is necessary. The wake-up call can also be generated automatically at a certain prevailing time.

Preferably, a signal line goes from a signal circuit of the conveyor to the wake up circuit of the motor drive (frequency converter) as a serial data signal line, such that the motor drive wakes up when any kind of data stream/pulse sequence of minimum length is sent to the wake up circuit. After wake up, advantageously the very same signal line is used for data communication between the conveyor control and the motor drive. This has the advantage that no extra signal lines are required between the motor drive and the conveyor control for this deep sleep mode implementation, such that no changes are required for the existing signal interfaces.

In the most preferred embodiment, in the deep sleep mode every component inside the motor drive except the wake-up circuit is turned off. This way the energy saving effect is as high as possible.

The above mentioned embodiments of the invention can be combined with teach other arbitrarily. The method may use the features of the conveyor claims and the claimed conveyor may use the features of the method claims.

Following terms are used as a synonym: conveyor—passenger conveyor—elevator —escalator—moving walk; elevator ropes—hoisting ropes; PTC resistor—thermistor —varistor—resistor—current limiting component; motor drive—frequency converter; elevator control—elevator control unit;

BRIEF DESCRIPTION OF THE DRAWING

The invention is now described schematically in a preferred embodiment in connection with the figures. In the figures

DETAILED DESCRIPTION

Figure 1:
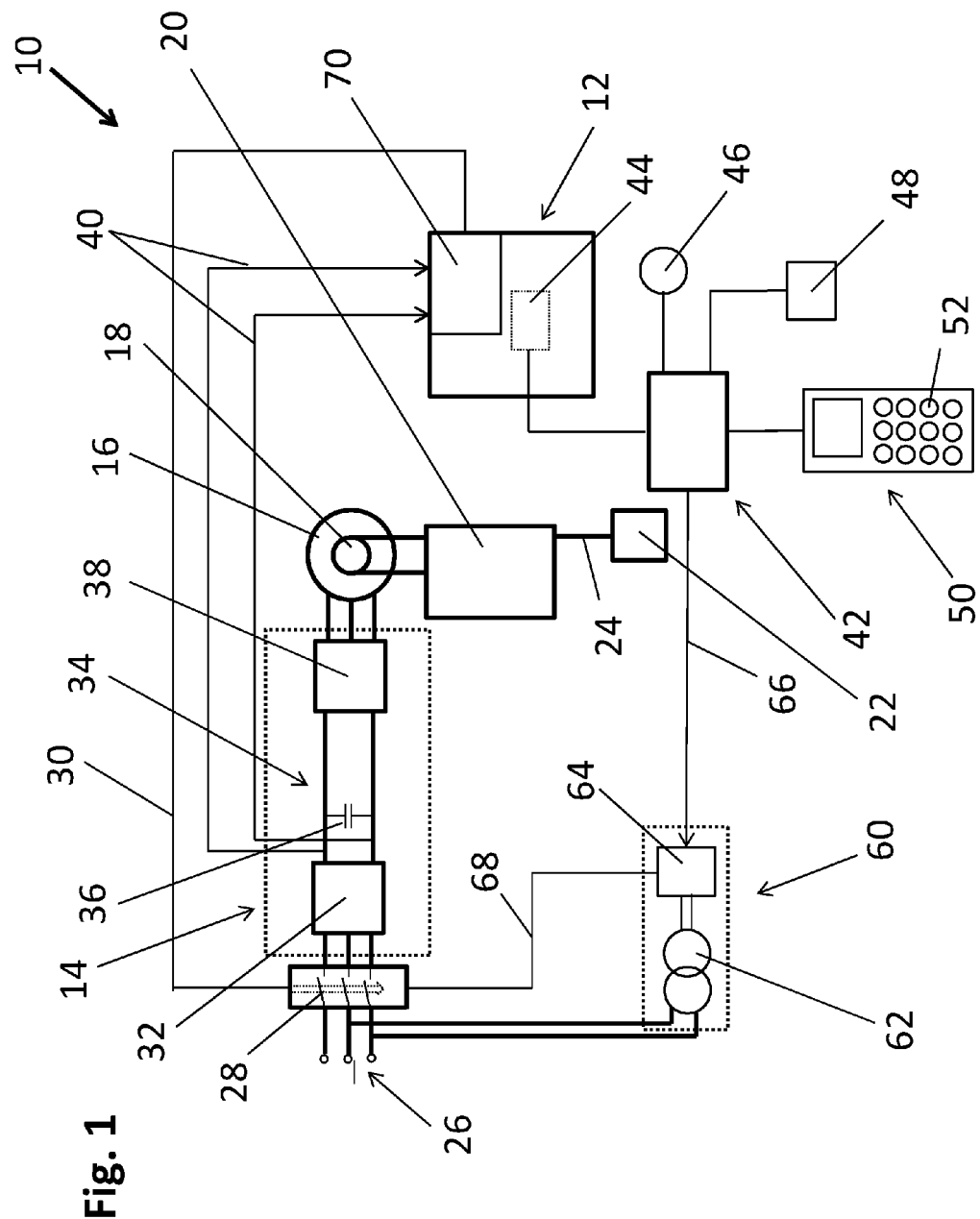
FIG. 1 shows a schematic diagram of an inventive elevator.

The elevator 10 comprises an elevator control 12, a motor drive 14, an elevator motor 16, optionally with a traction sheave 18 driving an elevator car 20 as well as optionally a counter weight 22 via elevator ropes 24. The motor drive 14 is connected to mains 26 via a relay 28 which is controlled by the elevator control 12 via relay control line 30. The motor drive 14 comprises a rectifier bridge 32, an intermediate DC circuit 34 with a capacitor 36 located between the positive and negative branch of the DC circuit as well as a converter bridge 38 connected with the elevator motor 16. The intermediate DC circuit 34 is connected with the elevator control 12 via supply lines 40 which form the power supply for the elevator control 12. On the other hand, the elevator control 12 controls the semiconductor switches of the converter bridge 38 of the motor drive 14. The motor drive 14 may be a regenerative motor drive, in which case rectifier bridge 32 may be configured to regenerate energy from the DC intermediate circuit back to the mains. The elevator 10 further comprises a signal circuit 42 which is connected with a monitoring circuit 44 in the elevator control 12, with internet 46 to be able to be contacted by a remote monitoring center, as well as with internal or external signal issuing means 48, for example monitoring means or a clock circuit. The most essential connection of the signal circuit 42 is to any call giving device 50 as e.g. car call panels and floor call panels in the elevator 10. These call giving devices 50 may comprise push buttons 52 as well as contactless call giving devices, for example via RFID or any other transmitter devices. The elevator further comprises a wake-up circuit 60 comprising a transformer 62 connected to mains 26 as well as a wake-up control 64 connected to the transformer 62. The wake-up control 64 is also connected via a signal control line 66 with the signal circuit 42 to receive wake-up signals via wake-up signal line 66 from the signal circuit 42. The wake-up control 64 is further connected to the relay 28 via the relay control line 68.

The elevator control 12 comprises an automatic start module 70 which is activated during re-start of the elevator control 12 and initiates automatic start of the elevator control 12 after power-up of the intermediate DC circuit 34.

The invention works as follows:

In certain cases, for example after a certain time period of inactivity, for example after 15 or 30 minutes of inactivity, the elevator control 12 initiates a deep sleep mode via the relay control line 30, disconnecting the relay 28 whereby the motor drive 14 is de-energized. This also leads to the loss of the power supply for the elevator control 12 via the supply lines 40. Still active in deep-sleep mode are the signal circuit 42 as well as the wake-up circuit 60 which are preferably always running. When the signal circuit 42 gets a signal from any of the signal issuing components as e.g. monitoring circuit 44, internet 46, external signal issuing devices 48 or call giving devices 50 via call buttons 52 or wireless ID readers (not shown), it issues via the wake-up signal line 66 a wake-up signal to the wake-up control 64 which then initiates the relay 28 via the wake-up control line 68 to close the relay 28. The closing of the relay 28 leads to the power-up of the intermediate DC circuit 34 so that the elevator control again receives power via the supply lines 40. In this case, the automatic starting module 70 of the elevator control automatically initiates the elevator control to restart its operation.

Figure 2:
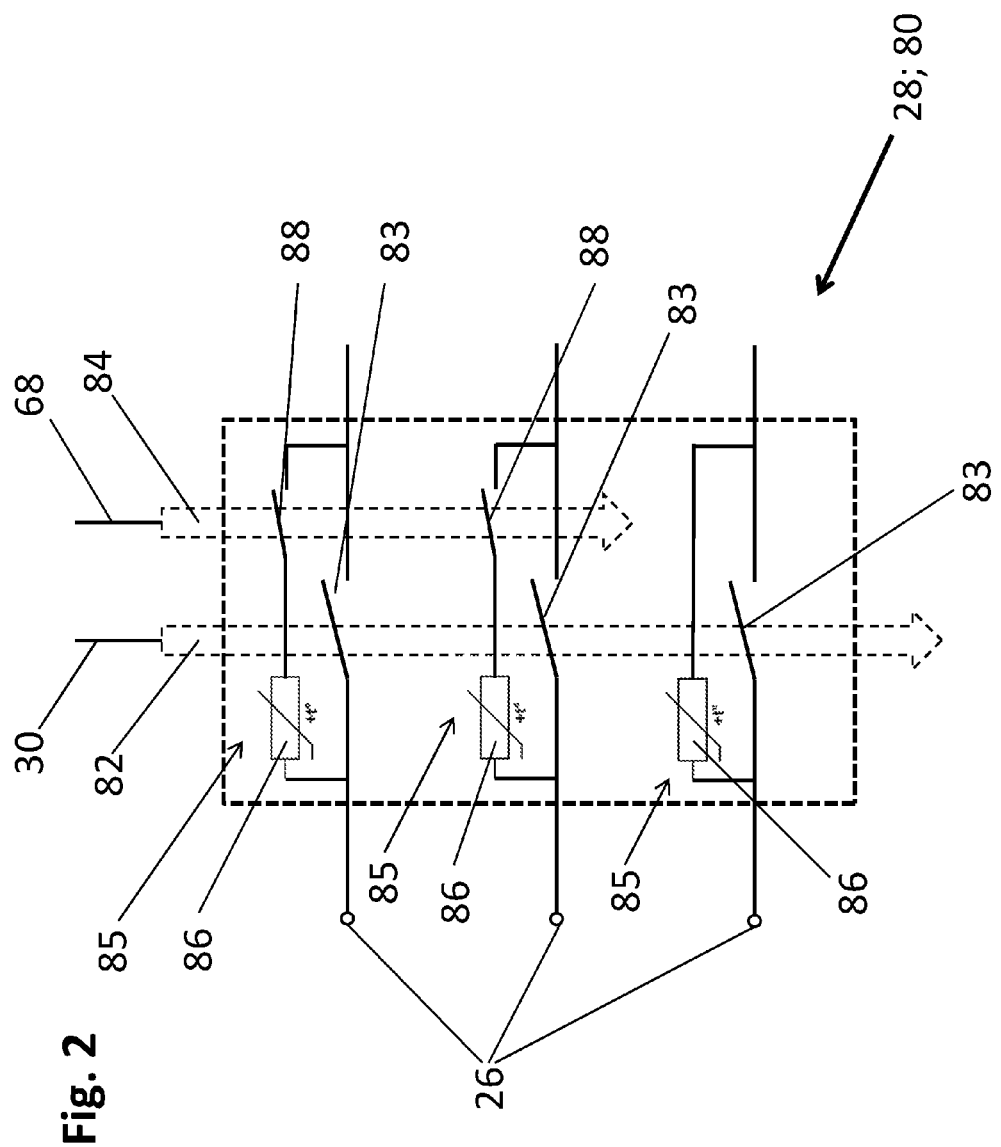
FIG. 2 shows a relay between mains and the rectifier bridge of a frequency converter having a parallel main relay and charging relay.

FIG. 2 shows a different embodiment of a relay 28 which has the reference number 80. The relay 80 comprises a parallel connection of a main relay 82 with main switches 83 for each phase and a charging relay 84 which comprises a series connection of a PTC resistor 86 and a corresponding charging relay switch 88. The invention works as follows. In case the elevator control 12 activates the deep sleep mode it initiates the main relay 82 as well as the charging relay 84 to open the corresponding relay switches 83, 88.

As mentioned above, in the deep sleep mode, both relays are open so that the frequency converter is completely switched off. In case the wake-up circuit 60 receives a wake-up signal via the wake-up signal line 66 from the signal circuit 42, it controls via the wake-up control line 68 the charging relay 84 to close the corresponding relay switches 88. This leads to a re-charging of the capacitor 36 in the intermediate DC circuit with a limited current resulting in the voltage of the intermediate DC circuit rising. This leads to the supply of energy via the supply lines 40 to the elevator control 12 whereafter the automatic starting module 70 of the elevator control 12 initiates the main relay 82 to close so that now the frequency converter or motor bridge 14 is again fully connected to mains 26. In practice, a motor control part of elevator control 12 sets a control signal that closes the main relay 82. In this connection it is to remark that the switches 83 of the main relay are heavy duty switches (e.g. relays or contactors) which are able to transfer high currents. The switches 88 of the charging relay are essentially smaller and are only intended to reload the capacitor 36 in the intermediate DC circuit with a comparably low current.

In the most preferred embodiment the wake-up circuit 60 is located inside the motor drive 14 (frequency converter). The signal circuit 42 is preferably located inside of the elevator control 12. A motor control part of the elevator control 12 is located inside the motor drive 14, and it controls the semiconductor switches of the converter bridge 38 of the motor drive 14. Other parts of elevator control 12, such as processing of elevator calls, are located in the elevator control unit.

In practice, the signal line 66 goes from the signal circuit 42 to the wake up circuit 60 of the frequency converter 14 as a serial data signal line, such that frequency converter 14 wakes up when any kind of data stream/pulse sequence e.g. of a minimum length is sent to the wake up circuit 64. After wake up, the very same signal line 66 is used for data communication between the elevator control 12 and the frequency converter 14. This has the advantage that no extra signal lines are required between the frequency converter 14 and the elevator control 12 for this deep sleep mode implementation, such that no changes are required for the existing signal interfaces.

In the most preferred embodiment, in the deep sleep mode every component inside the frequency converter 14 except the wake-up circuit 60 is turned off. This way the energy saving effect is as high as possible.

The described embodiments should not be regarded as delimiting the present invention which is defined by the appended patent claims.

REFERENCE LIST 10 elevator
12 elevator control
14 motor drive
16 elevator motor
18 traction sheave
20 elevator car
22 counterweight
24 elevator ropes
26 mains—public three phase AC network
28 relay
30 relay control line
32 rectifier bridge
34 intermediate DC circuit—DC link
36 capacitor
38 converter bridge
40 supply lines
42 signal circuit
44 monitoring circuit
46 internet
48 external signal issuing device
50 call giving device
52 car call buttons—hall call buttons
60 wake-up circuit
62 transformer—low power transformer
64 wake-up control
66 wake-up signal line
68 wake-up control line
70 automatic starting module of the elevator control
80 relay (second embodiment)
82 main relay
83 main relay switch
84 charging relay
85 charging circuit 26 PTC resistor—varistor
88 charging relay switch

The invention claimed is:

1. A passenger conveyor comprising:
   a conveyor motor;
   a motor drive configured to drive the conveying motor, the motor drive including,
      a frequency converter with a rectifier bridge, the rectifier bridge connected to mains via at least one relay,
      an intermediate DC circuit, and
      a converter bridge connected with the conveyor motor;
   a conveying controller configured to control the passenger conveyor by setting the passenger conveyor to a deep sleep mode by opening a main relay and a charging relay of the at least one relay to switch off the frequency converter and at least a portion of the conveying controller;
   a signaling circuit configured to remain powered during the deep sleep mode; and
   a wake-up circuit connected to the signaling circuit, the wake-up circuit configured to remain powered at least during the deep sleep mode, the wake-up circuit configured to close the charging relay in response to a signal from the signaling circuit.

2. The passenger conveyor according to claim 1, wherein the charging relay is configured to charge a capacitor associated with the intermediate DC circuit, the charging relay including at least one current limiting component connected to a charging relay switch.

3. The passenger conveyor according to claim 2, wherein the current limiting component is a PTC thermistor connected in series with the charging relay switch.

4. The passenger conveyor according to claim 1, wherein the conveyor controller is configured to automatically restart and to close the main relay after the charging relay is closed.

5. The passenger conveyor according to claim 1, wherein the wake-up circuit comprises:
   a power supply.

6. The passenger conveyor according to claim 5, wherein the power supply is a transformer connected to the mains.

7. The passenger conveyor according to claim 6, wherein the transformer has a power consumption of less than 10 W.

8. The passenger conveyor according to claim 1, wherein the signaling circuit is connected to one or more call giving devices of the passenger conveyor.

9. The passenger conveyor according to claim 1, wherein the signaling circuit is connected to a remote monitoring center of the passenger conveyor.

10. The passenger conveyor according to claim 1, wherein the signaling circuit is connected with a signal generating device.

11. The passenger conveyor according to claim 1, wherein the conveyor controller is configured to activate the deep sleep mode after no call has been issued for a set time period.

12. The passenger conveyor according to claim 1, wherein the conveyor controller is configured to activate the deep sleep mode based on the prevailing time.

13. The passenger conveyor according to claim 1, wherein the charging relay is connected in parallel to the main relay.

14. The passenger conveyor according to claim 1, wherein the passenger conveyor is configured to automatically restart the conveyor controller by closing the main relay connecting the rectifier bridge with the mains after charging up the intermediate DC circuit.

15. A method for operating a passenger conveyor comprising:
   setting, via a conveying controller, the passenger conveyor to a deep sleep mode by opening a main relay and a charging relay to switch off a frequency converter and at least a portion of the conveying controller while continuing to supply power to at least one signaling circuit of the passenger conveyor;
   receiving a wake-up signal from the signaling circuit; and
   charging an intermediate DC circuit by closing the charging relay to charge the intermediate DC circuit in response to receipt of the wake-up signal from the signaling circuit.

16. The method according to claim 15, wherein the charging relay includes a current limiting component.

17. The method according to claim 16, further comprising:
   generating the wake-up signal in response to one or more of,
      issuance of a call by a call giving device,
      receipt of a remote monitoring signal, and
      issuance of an operation anomaly signal by a monitoring circuit.

18. The method of claim 15, wherein the passenger conveyor includes a conveyor motor, a motor drive, the conveying controller, the signaling circuit and a wake-up circuit, the motor drive including the frequency converter with a rectifier bridge, an intermediate DC circuit, and a converter bridge connected with the conveyor motor, the rectifier bridge connected to mains via the main relay.

19. The method of claim 15, further comprising:
   automatically restarting the conveyor controller by closing the main relay connecting a rectifier bridge with mains after charging up the intermediate DC circuit.

* * * * *